United States Patent
Raghavan

(10) Patent No.: US 6,792,419 B1
(45) Date of Patent: Sep. 14, 2004

(54) SYSTEM AND METHOD FOR RANKING HYPERLINKED DOCUMENTS BASED ON A STOCHASTIC BACKOFF PROCESSES

(75) Inventor: Prabhakar Raghavan, Saratoga, CA (US)

(73) Assignee: Verity, Inc., Sunnyvale, CA (US)

( * ) Notice: Subject to any disclaimer, the term of this patent is extended or adjusted under 35 U.S.C. 154(b) by 196 days.

(21) Appl. No.: 09/703,538

(22) Filed: Oct. 30, 2000

(51) Int. Cl.[7] ............................................. G06F 17/30
(52) U.S. Cl. ................................. 707/3; 703/4; 703/5
(58) Field of Search ............................. 707/3, 4, 2, 10, 707/5

(56) References Cited

U.S. PATENT DOCUMENTS 6,026,413 A * 2/2000 Challenger et al. ......... 707/202
6,151,595 A * 11/2000 Pirolli et al. .................... 707/1
6,285,999 B1 * 9/2001 Page .............................. 707/5

OTHER PUBLICATIONS

Fagin et al. (Random Walks with "back button").*
*Authoritative Sources in a Hyperlinked Environment.*, Jon M. Kleinberg, Dept. of Computer Science, Cornell University, Ithaca, NY (1997).

*The Anatomy of a Large–Scale Hypertextual Web Search Engine,* Sergey Brin and Lawrence Page, Computer Science Department, Stanford University, Stanford, CA 94305 (1998).

\* cited by examiner

Primary Examiner—Jean M. Corrielus
Assistant Examiner—Baoquoc N To
(74) Attorney, Agent, or Firm—Gray Cary Ware & Freidenrich LLP

(57) ABSTRACT

A system and method for ranking hyperlinked documents, such as web pages, is provided wherein a stochastic backoff process is used to rank those hyperlinked documents. In more detail, the stochastic process is derived from a random walk through the pages of the web. First, a directed graph may be generated from a crawl wherein the nodes are documents in the crawl and a directed edge from one node A to another node B indicates the presence of a hyperlink from the corresponding document docA to document docB. Using a stochastic backoff process on this graph, a weight between 0 and 1 is assigned to each document so that the documents may be ranked according to the weights.

32 Claims, 2 Drawing Sheets

SYSTEM AND METHOD FOR RANKING HYPERLINKED DOCUMENTS BASED ON A STOCHASTIC BACKOFF PROCESSES

BACKGROUND OF THE INVENTION

This invention relates generally to a system and method for ranking documents to provide a user with a score of the relevance of a document and in particular to a system and method for ranking a hyperlinked document based on a stochastic backoff process.

In typical information retrieval systems, such as search engines, documents are typically ranked, in response to the keyword queries entered by the user, using well-known statistics based on the number and positions of the keywords in each document. A summary of these typical ranking systems is described in a book entitled "Managing Gigabytes" by Ian H. Witten, Alistair Moffat and Timothy C. Bell published by Van Nostrand Reinhold, New York, 1994. Such methods will work even in the absence of any hyperlinks between documents. The method proposed here, on the other hand, applies specifically to hyperlinked environments, and uses the presence and locations of hyperlinks to determine the ranks of documents. The weights produced by our procedure can of course be combined with the weights from the standard statistical methods, and the composite weights can also be used for ranking in some applications.

This is not the first proposal for exploiting hyperlinks to rank documents. Kleinberg proposed a different ranking scheme in which he used spectral methods on a square symmetric matrix derived from a subgraph of the crawl graph, to determine so called hubs and authorities for a search topic. J. Kleinberg. *Authoritative Sources in a Hyperlinked Environment*, Proceedings of the 9th ACM-SIAM Symposium on Discrete Algorithms, 1998. Extended version in Journal of the ACM 46(1999). His paper also appears as IBM Research Report RJ 10076, May 1997.

Fagin et al. study a variety of different random walks and mathematically characterize their behavior. R. Fagin, A. R. Karlin, J. M. Kleinberg, P. Raghavan, R. Rubinfeld, S. Rajagopalan, M. Sudan and A. Tomkins, *Random Walks with "back buttons"*, Proceedings of the ACM Symposium on Theory of Computing, 2000, ACM Press, New York, N.Y. A random walk is an abstract process wherein a random path through a directed graph of web pages is followed. The paper describes under what conditions limiting probability distributions exist for the random walks, and provides methods for computing these limiting probabilities when they exist. They do not, however, consider applications of these stochastic processes to the ranking of hypertext documents.

Brin and Page used a method to assign to each document in a hyperlinked environment a Pagerank that is used for ranking the document. S. Brin and L. Page, *Anatomy of a Large-Scale Hypertextual Web-Search Engine*, Proceedings of the Seventh International World-wide web conference, WWW7, Brisbane, 1998 (published by Elsevier in Amsterdam). The ranking is then used in a search engine to present documents to the user based on rank. This ranking is used, for example, by the Google® search engine on the world wide web. It should be noted, however, that they use a random walk that is very different from the one we use. For instance, there are no backward steps at all in their scheme—instead, they have a random jump operation in which the walker "teleports" to a completely random node in the graph at certain points of the walk.

A stochastic backoff process is a mathematical way to model the behavior of a user that is browsing web pages wherein the domain of web pages is represented by a directed graph. In a stochastic backoff process, the backwards steps of a user from a current node in a directed graph to a prior node may affect the score assigned to a particular web page. The stochastic backoff process provides a good way to model the behavior of a user. Thus, it is desirable to provide a system and method for ranking hyperlinked documents based on a stochastic backoff process and it is to this end that the present invention is directed.

SUMMARY OF THE INVENTION

A ranking system and method are provided wherein documents with hyperlinks, such as documents on the World Wide Web (WWW), are ranked according to a stochastic backoff process. The ranking method and system are based on a stochastic process derived from a random walk through the pages of the web. In particular, the input to the method is a crawl of the hyperlinked environment at hand (e.g., the web, a corporation's intranet or any combination of these). From the crawl, we build a directed graph each of whose nodes is a document in the crawl, with a directed edge from one node A to another node B indicating the presence of a hyperlink from the corresponding document docA to document docB. Next, we define a stochastic process on this graph, as detailed in the following paragraph. Finally, we invoke the formulas in the work of Fagin et al. to compute, for each document, a weight between0 and 1. The documents in our crawl are now ordered by their weights. In response to a query (say, "all documents containing the word dog or any of its synonyms"), we first retrieve the documents matching the query criteria (a standard task in information retrieval, see for instance Witten et al.). Next, we present these documents to the user sorted in decreasing order of weight.

In accordance with the invention, a system and method for searching for one or more hyperlinked documents that match a search query is provided. The search system generates a directed graph from a crawl through one or more documents wherein the directed graph has one or more nodes representing one or more documents traversed during the crawl and one or more directed edges wherein each directed edge represents a hyperlink from a first document to a second document. A weight for each document in the directed graph may be determined based on a stochastic backoff process. Once this preprocessing has occurred, a search query is received, one or more documents are retrieved that match a search query, and a ranking of the documents based on the determined weight is generated.

In accordance with another aspect of the invention, a system and method for ranking of one or more hyperlinked documents is provided. The ranking method generates a directed graph from a crawl through one or more documents wherein the directed graph has one or more nodes representing one or more documents traversed during the crawl and one or more directed edges wherein each directed edge represents a hyperlink from a first document to a second document. A weight of each document in the directed graph may be determined based on a stochastic backoff process and a ranking of the documents is generated based on the determined weight.

DETAILED DESCRIPTION OF A PREFERRED EMBODIMENT

The invention is particularly applicable to a system and method for ranking documents that may be presented to the user based on a user's queries of a search engine and it is in this context that the invention will be described. It will be appreciated, however, that the system and method in accordance with the invention has greater utility, such as to any other systems in which it is desirable to be able to rank a document containing hyperlinks.

Figure 1:
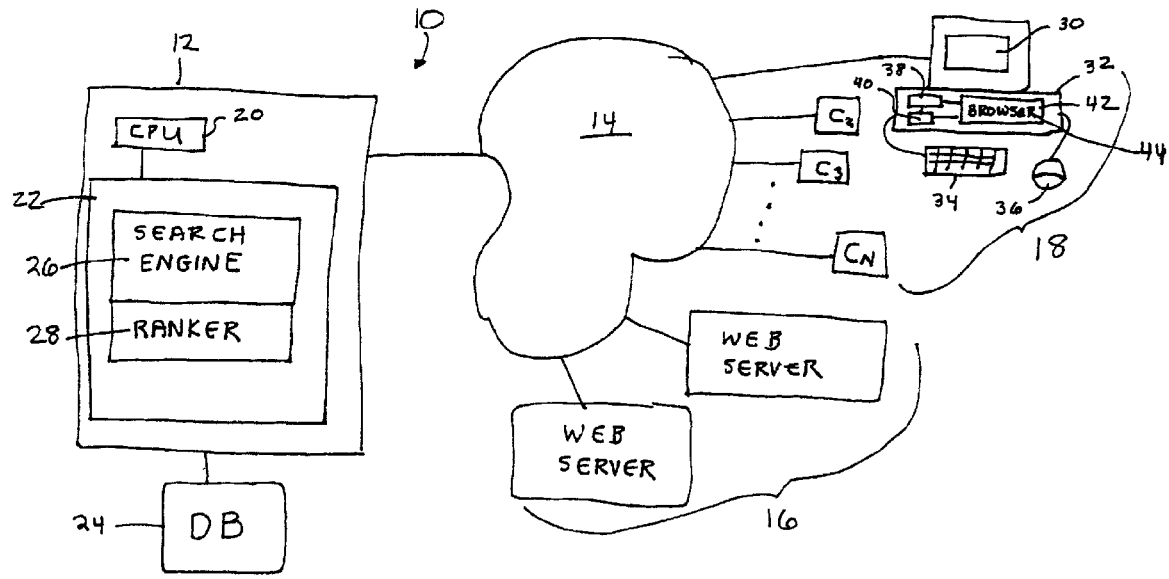
FIG. 1 is a diagram illustrating an example of web-based search engine system in accordance with the invention that may use the ranking system in accordance with the invention.

FIG. 1 is a diagram illustrating an example of web-based search engine system 10 in accordance with the invention that may use the ranking system in accordance with the invention. In this system, a search server 12 is connected to a computer or data network 14, such as a wide area network, a local area network, a corporate intranet, the Internet or preferably the World Wide Web, to one or more web servers 16 and one or more client computers 18 (C1, C2, C3, . . . , Cn). Generally, users of the one or more client computers may issue search queries (typically containing one or more query terms/keywords) to the search server 12 over the computer network, the search server may perform a search of the Web servers 16 for documents that match the query terms of the user and the results of the search may be returned in ranked order to the client computer over the computer network. In this example, a web-based embodiment is shown, but the search system in accordance with the invention may also be implemented using any other computer systems. For example, the search engine may be located on a corporate intranet.

In more detail, the search server 12 may include a central processing unit (CPU) 20 that controls the operation of the server, a memory 22 and a persistent storage device 24, such as a hard disk, an optical disk, a tape drive or the like, for permanently storing data, such as a database containing an index of web pages. As is well known, a piece of software may be stored in the persistent storage device and then downloaded into the memory 22 when the CPU is executing the piece of software. In this example, the memory may store a search engine 26 and a ranker 28. The search engine may receive the search request, retrieve documents that match the search request. The ranker may rank those documents returned to the user so that the most relevant documents are presented to the user first as is well known. In accordance with the invention, the ranker may implement a stochastic process as described below to rank the documents presented to the user. Thus, in accordance with the invention, one or more documents ranked according to a stochastic process may be presented to the user by the search engine. As with other typical web-based search engines, the results of the search may be provided to the user as one or more web pages downloaded to the client computer wherein each web page contains one or more links to the ranked documents.

Each client computer 18 may include a display unit 30, such as a liquid crystal display a cathode ray tube or the like, a chassis 32 and one or more input/output devices, such as a keyboard 34 and a mouse 36 shown, that permit the user to interact with the client computer. For, example, the keyboard may permit the user to enter a search query while the mouse may permit the user to select a link to a document from a web page returned by the search engine. The chassis 32 may house a central processing unit 38 that controls the operation of the client computer, a persistent storage device 40, such as a hard disk, a tape drive, a CD-ROM or the like for permanently storing one or more pieces of software and a memory 42 for temporarily storing the software while it is being executed by the CPU as is well known. In the example shown, the memory 42 may store a browser software application 44, such as Netscape Navigator or Microsoft Explorer, that permits the user of the client computer to interact with web servers, such as the search server 12, using a typical protocol,: such as the hypertext transfer protocol (HTTP) or any other protocol. Using the browser, a user may connect to the search server 12 over the computer network 14 and receive a web page containing a form for entering search query terms. The user may then submit the form and may then receive one or more web pages containing links to documents that match the query terms. To rank the documents in accordance with the invention, a directed graph of a crawl through a domain of web pages is built. Then, a weight of each document in the directed graph is determined using a stochastic backoff process involving a random walk. The weight may then be used to rank the documents that match the user's query. An example of a directed graph will now be described.

Figure 2:
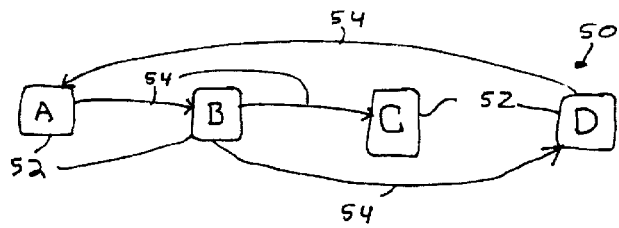
FIG. 2 is a diagram illustrating an example of a directed graph.

FIG. 2 is a diagram illustrating an example of a directed graph 50 generated by crawling through one or more documents. In accordance with the invention, the crawling through hyperlinked documents, such as browsing/surfing the WWW, may be represented by the graph wherein each node 52 (A, B, C and D in this example) represents a document in the crawl. Each directed edge 54 of the graph indicates the presence of a hyperlink from one document to another document in the crawl. For example, the directed edge between node A and node B indicates the presence of a hyperlink from the corresponding document docA to document docB. The figure of the graph may also illustrate the hyperlinks between other documents in the crawl. In accordance with the invention, the graph also illustrates if a user may move forward from that document to another document (if there is a directed edge from the node to another node) or if a user must move backwards from the current node (if the node does not have any directed edges leading from it to other nodes, such as node C). Using the directed graph and the stochastic method described below the documents returned to the user may be ranked in a novel manner.

Figure 3:
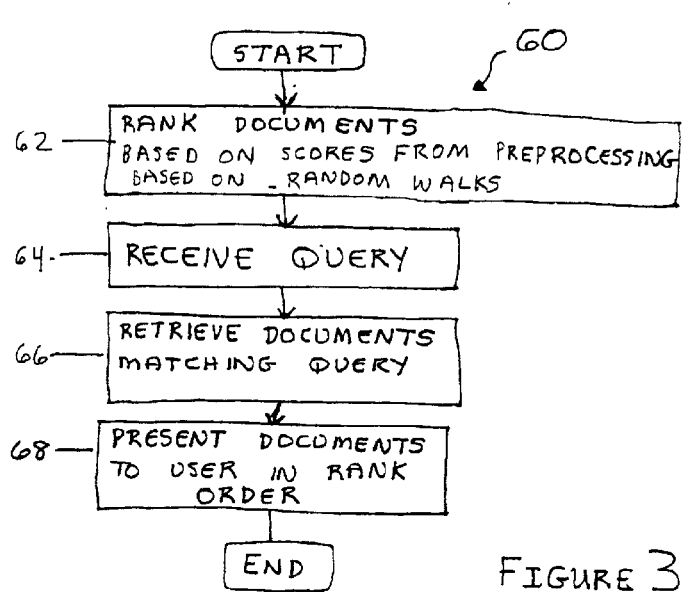
FIG. 3 is a flowchart illustrating a search method in accordance with the invention.

FIG. 3 is a flowchart illustrating a search method 60 in accordance with the invention. In general, when searching for documents in a hyperlinked environment such as the world wide web (WWW) or the intranet of a corporation (or any other computer network), it is necessary to rank the pages matching a specific criterion (for example, pages may be ranked according to all pages containing a keyword or its associated synonyms). This rank ordering may be used, for instance, to order the results of a user's query when presenting the results to the user so that the user hopefully views the most relevant documents before the less relevant documents. Other applications include presenting recommended documents to a user based on the contents of documents previously viewed by the user.

Figure 4:
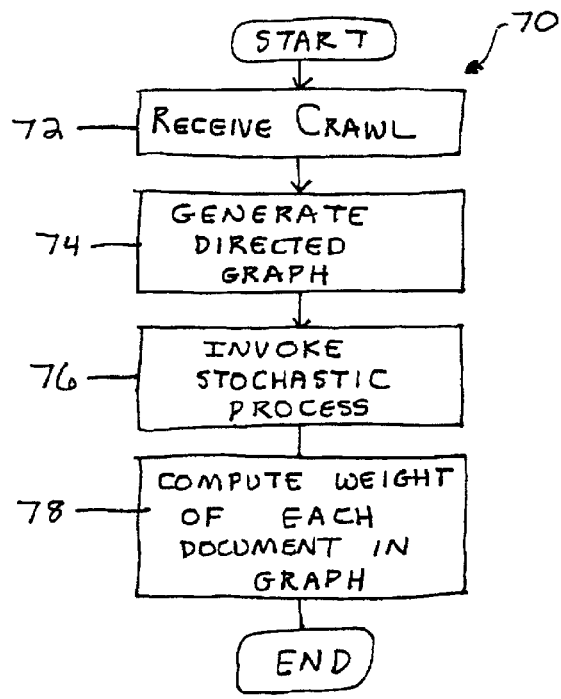
FIG. 4 is a flowchart illustrating a ranking method in accordance with the invention.

The search method 60 may include a preprocessing step 62, as described in more detail in FIG. 4, performed prior to any search query wherein the weights (ranks) for each document in a crawl are determined. The preprocessing step is similar to an indexing step in that ranks of documents are determined. In more detail, a crawl of the domain is performed and a directed graph is generated. Next, a random walk on the directed graph is performed and weights between 0 and 1 are assigned to each document in the directed graph. In step 64, a user query is received wherein the query may contain one or more keywords or query terms. In step 66, the search engine may retrieve the documents that match the query terms/keywords as is well known. In step 68, the documents matching the user's query are presented to the user in ranked order based on the ranking determined during the preprocessing step. Now, the ranking method in accordance with the invention will be described in more detail.

FIG. 4 is a flowchart illustrating a ranking method 70 in accordance with the invention. The ranking method is based on a stochastic process derived from a random walk through a directed graph derived from a crawl. The input to the method is a crawl of the hyperlinked environment at hand (the web, or a corporation's intranet, or any combination of these) in step 72. From the crawl, a directed graph may be built in step 74 as described above. Next, we define a stochastic process on this graph in step 76 as detailed below with reference to FIG. 5. Next, in step 78, a weight for each document may be computed wherein the weight is between 0 and 1. The method for computing the weight of the document may be computed in accordance with the Fagin article described above. After the weights have been determined, the documents in our crawl are now ordered by their weights. In response to a query (e.g., "all documents containing the word dog or any of its synonyms"), as described above, we first retrieve the documents matching the query criteria (a standard task in information retrieval, see for instance Witten et al.) and then present these documents to the user sorted in decreasing order of weight. Now, more details of the ranking method will be described.

Figure 5:
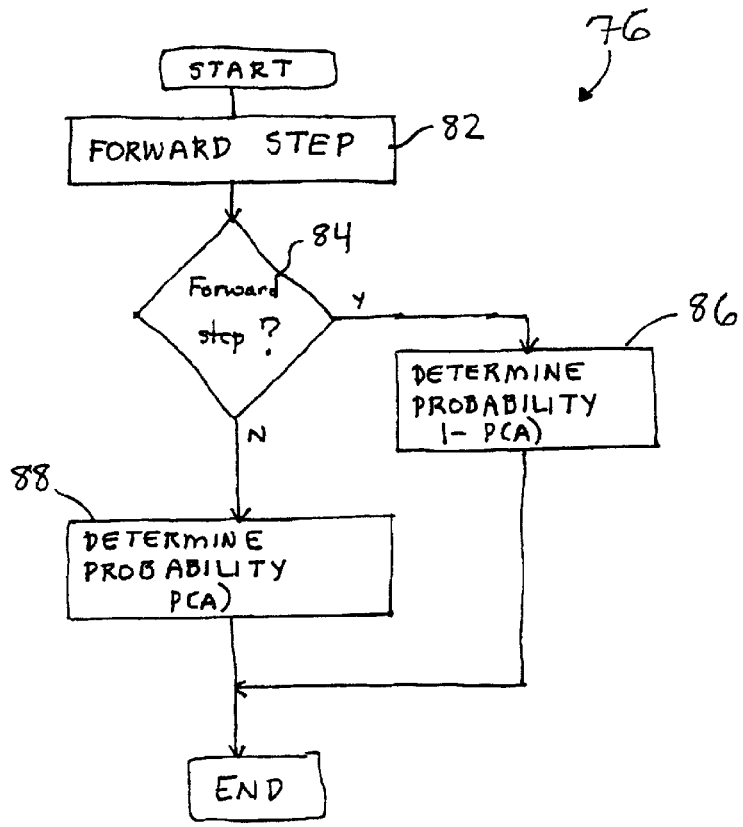
FIG. 5 is a flowchart illustrating more details of the ranking method in accordance with the invention.

FIG. 5 is a flowchart illustrating more details of the ranking step 76 in accordance with the invention. In particular, the stochastic process on the graph derived from the web crawl. Consider a random walk on the graph shown in FIG. 2 in which a "walker" starts at some node A of the graph. At the next time step, it proceeds from A to a node B of the graph, where B is determined by the following rules (the precise values of p(A) for the various nodes A, and p(A,B) for the node-pairs A, B, depend on the application and preferred embodiments for computing those probabilities are described below). In a first step 82, a forward step occurs since there is no possible backward step. Thereafter, with probability p(A), the walker decides to take a backward step, and with probability 1-p(A) the walker decides to take a forward step. Now, forward and backward steps are defined. On a forward step, the walker proceeds to a node B for which there is a directed edge from A to B. When there are multiple directed edges out of A, then a particular node B is chosen with probability p(A,B). On a backward step, the walker proceeds to the unique node D from which the last forward step into A was taken. This has the natural meaning of undoing the step that brought the walker into A. The values of the probabilities p(A) (one value for each node A) and p(A,B) (one value for each pair A,B for which there is a directed edge from A to B) are governed by the following rules:

(1) All of these probabilities lie between 0 and 1;
(2) The sum, over all possible forward destinations B, of p(A,B) is 1 at every node A; and
(3) When there is no directed edge leading out of a node A, then p(A) is 1(i.e., on entering A, the walker is forced to take a backward step).

Beyond these constraints, two preferred embodiments for choosing the probabilities are now described. Each contains a method for choosing the values p(A) and the values p(A,B) and these choices from the two methods can be combined in various ways. In a first preferred method, all of the probabilities p(A) are made equal to a fixed constant such as 0.25. Then, each probability p(A,B) is set equal to 1/d where d is the number of directed edges from A to other nodes. In a preferred second method, a large number of browsers traversing the hypertext is observed for a period of time. Then, statistics are collected from these browsing patterns and used to compute (a) how often browsers at a node A click the "back button" on their browsers (e.g., the fraction of visits to A that are followed by a back button click is made p(A)); and (b)what fraction of the remaining visits to A (i.e., those that are not followed by a back button click) are followed by a visit to B (there being a directed edge corresponding to a hyperlink from A to B)—this fraction is made p(A,B).

Given the values for p(A) at the various nodes and p(A,B) for the various directed edges (A,B), the work of Fagin et al. described above and incorporated herein by reference gives a computational procedure for assigning, to each node A, a limiting probability z(A) as described in more detail in the work. In accordance with the invention, we set the weight of a node A to be this limiting probability z(A) and then order pages by these weights for ranking as described above.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for searching for one or more hyperlinked documents that match a search query, comprising:

generating a directed graph from a crawl through one or more documents, the directed graph having one or more nodes representing one or more documents traversed during the crawl and one or more directed edges wherein each directed edge represents a hyperlink from a first document to a second document;

determining a weight for each document in the directed graph based on a stochastic backoff process that includes:

determining a forward probability 1-p(A) for each possible forward step from a node A that is taken by following a directed edge, wherein the forward step includes proceeding from node A to a node B where there is a directed edge from node A to node B;

determining a backward probability p(A) for each possible backward step from the node A, wherein the backward step is taken by using a browser back button, the backward step including proceeding from the node A to a previously visited node from which a forward step was taken into node A; and determining a pair probability p(A,B) for a directed graph from the node A to the node B such that a sum of all p(A,B) is 1;

retrieving one or more documents that match a search query; and generating a ranking of the documents based on the determined weight such that relative ranks of the documents depend on the forward probability 1-p(A), the backward probability p(A), and the pair probability p(A,B) associated with each document.

2. The method of claim 1, wherein determining the weight further comprises receiving information about one or more documents traversed during a random walk through one or more documents wherein the random walk is characterized by a forward step from a first document to a second document and a backward step from a current document back to a document already traversed.

3. The method of claim 2, wherein determining the weight further comprises assigning a probability to each node of the directed graph corresponding to a likelihood that a user will traverse that node during the random walk and assigning a probability to each directed edge corresponding to a likelihood that a user will move along the directed edge during the random walk.

4. A system for searching for one or more hyperlinked documents that match a search query, comprising:
    a directed graph from a crawl through one or more documents, the directed graph having one or more nodes representing one or more document traversed during the crawl and one or more directed edges wherein each directed edge represent a hyperlink from a first document to a second document;
    means for determining a weight of each document in the directed graph based on a stochastic backoff process that includes:
        means for determining a forward probability 1-p(A) for each possible forward step from a node A that is taken by following a directed edge, wherein the forward step includes proceeding from node A to a node B where there is a directed edge from node A to node B;
        means for determining a backward probability p(A) for each possible backward step from the node A, wherein the backward step is taken by using a browser back button, the backward step including proceeding from the node A to a previously visited node from which a forward step was taken into node A;
    mean for retrieving one or more documents that match a search query; and
    means for generating a ranking of the documents based on the determined weight such that relative ranks of the document depend on the forward probability 1-p(A), the backward probability p(A), and the pair probability p(A,B) associated with each document.

5. The system of claim 4, wherein the weight determining means further comprises means for receiving information about one or more documents traversed during a random walk through one or more documents wherein the random walk is characterized by a forward step from a first document to a second document and a backward step from a current document back to a document already traversed.

6. The system of claim 5, wherein the determining means further comprises means for assigning a probability to each node of the directed graph corresponding to a likelihood that a user will traverse that node during the random walk and means for assigning a probability to each directed edge corresponding to a likelihood that a user will move along the directed edge during the random walk.

7. A method for ranking of one or more hyperlinked documents, comprising:
    generating a directed graph from a crawl through one or more documents, the directed graph having one or more nodes representing one or more documents traversed during the crawl and one or more directed edges wherein each directed edge represents a hyperlink from a first document to a second document;
    determining a weight of each document based on a stochastic process that includes:
        determining a backward probability p(A) for each possible backward step from a node A that is taken by following a directed edge, wherein the forward step includes proceeding from node A to a node B where there is a directed edge from node A to node B;
        determining a backward probability p(A) for each possible backward step from the node A, wherein the backward step is taken by using a browser back button, the backward step including proceeding from the node A to a previously visited node from which a forward step was taken into node A;
        determining a pair probability p(A,B) for a directed graph from the node A to a node B such that a sum of all p(A, B) is 1, and
    generating a ranking of the documents based on the determined weight such that relative ranks of the documents depend on the forward probability 1-p(A), the backward probability p(A), and the pair probability p(A, B) associated with each document.

8. The method of claim 7, wherein determining the weight further comprises receiving information about one or more documents traversed during a random walk through one or more documents wherein the random walk is characterized by a forward step from a first document to a second document and a backward step from a current document back to a document already traversed.

9. The method of claim 8, wherein determining the weight further comprises assigning a probability to each node of the directed graph corresponding to a likelihood that a user will traverse that node during the random walk and assigning a probability to each directed edge corresponding to a likelihood that a user will move along the directed edge during the random walk.

10. A system for ranking one or more hyperlink documents, comprising:
    a directed graph generated from a crawl through one or more documents, the directed graph having one or more nodes representing one or more documents traversed during the crawl and one or more directed edges wherein each directed edge representing a hyperlink from a first document to a second document;
    means for determining a forward probability 1-p(A) for each possible forward step from a node A that is taken by following a directed edge, wherein the forward step includes proceeding from node A to a node B where there is a directed edge from node A to node B;
    mean for determining a backward probability p(A) for each possible backward step from the node A, wherein the backward step is taken by using a browser back button, the backward step including proceeding from the node A to a previously visited node from which a forward step was taken into node A;
    means for determining a pair probability p(A, B) for a directed graph from the node A to node B such that a sum of all p(A, B) is 1; and
    means for generating a ranking of the documents based on determined weight such that relative ranks of the documents depend on the forward probability 1-p(A), the backward probability p(A), and the pair probability p(A, B) associated with each document.

11. The system of claim 10, wherein the weight determining means further comprises means for receiving information about one or more documents traversed during a random walk through one or more documents wherein the random walk is characterized by a forward step from a first document to a second document and a backward step from a current document back to a document already traversed.

12. The system of claim 11, wherein the determining means further comprises means for assigning a probability to each node of the directed graph corresponding to a likelihood that a user will traverse that node during the random walk and means for assigning a probability to each directed edge corresponding to a likelihood that a user will move along the directed edge during the random walk.

13. The method of claim 1, wherein each forward and backward probability is a value between 0 and 1 and a sum of the pair probability p(A,B) for each possible forward step is 1.

14. The method of claim 1 further comprising:
making each forward and backward probability a constant; and
setting each pair probability to 1/d wherein d is a number of directed edges from node A to another node.

15. The method of claim 1 further comprising:
counting a number of times a specific node is accessed from node A by taking a backward step according to a directed graph; and
tracking a fraction of forward steps in which a node A is followed by a forward step to a node B.

16. The method of claim 1 further comprising determining the weight of node A based on the values p(A) at various nodes and p(A,B) for various pairs.

17. The method of claim 4, wherein each forward and backward probability is a value between 0 and 1 and a sum of the pair probability p(A,B) for each possible forward step is 1.

18. The system of claim 4 further comprising:
means for making each forward and backward probability a constant; and
means for setting each pair probability to 1/d wherein d is a number of directed edges from node A to another node.

19. The system of claim 4 further comprising:
means for counting a number of times a specific node is accessed from node A by taking a backward step according to a directed graph; and
means for tracking a fraction of forward steps in which node A is followed by a forward step to a node B.

20. The system of claim 4 further comprising means for determining the weight of node A based on the values p(A) at various nodes and p(A,B) for various pairs.

21. The method of claim 7, wherein each forward and backward probability is a value between 0 and 1 and a sum of the pair probability p(A,B) for each possible forward step is 1.

22. The method of claim 7 further comprising:
making each forward and backward probability a constant; and
setting each pair probability to 1/d wherein d is a number of directed edges from node A to another node.

23. The method of claim 7 further comprising:
counting a number of times a specific node is accessed from node A by taking a backward step according to a directed graph; and
tracking a fraction of forward steps in which node A is followed by a forward step to a node B.

24. The method of claim 7 further comprising determining the weight of node A based on the values p(A) at various nodes and p(A,B) for various pairs.

25. The system of claim 10, wherein each forward and backward probability is a value between 0 and 1 and a sum of the pair probability p(A,B) for each possible forward step is 1.

26. The system of claim 10 further comprising:
means for making each forward and backward probability a constant; and
means for setting each pair probability to 1/d wherein d is a number of directed edges from node A to another node.

27. The system of claim 10 further comprising:
means for counting a number of times a specific node is accessed from node A by taking a backward step according to a directed graph; and
means for tracking a fraction of forward steps in which node A is followed by a forward step to a node B.

28. The system of claim 10 further comprising means for determining the weight of node A based on the values p(A) at various nodes and p(A,B) for various pairs.

29. The method of claim 1, wherein determining the backward probability p(A) comprises collecting usage statistics regarding visits to the node A that are followed by a click on the browser back button such that the usage statistics affect the ranking of the documents.

30. The method of claim 29, wherein determining the pair probability p(A,B) comprises collecting usage statistics regarding visit to the node A that are followed by a visit to the node B by using a link without using the browser back button.

31. The system of claim 4, wherein the means for determining the backward probability p(A) comprises means for collecting usage statistics regarding visits to the node A that are followed by a click on the browser back button such that the usage statistics affect the ranking of the documents.

32. The system of claim 31, wherein determining the pair probability p(A,B) comprises collecting usage statistics regarding visit to the node A that are followed by a visit to the node B by using a link without using the browser back button.

* * * * *